(12) United States Patent
Huang

(10) Patent No.: US 11,101,731 B2
(45) Date of Patent: Aug. 24, 2021

(54) SWITCHED-CAPACITOR DC-DC POWER CONVERTER CIRCUIT

(71) Applicant: NUVOTON TECHNOLOGY CORPORATION, Hsinchu (TW)

(72) Inventor: Po-Hsuan Huang, Tainan (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 6 days.

(21) Appl. No.: 16/711,913

(22) Filed: Dec. 12, 2019

(65) Prior Publication Data
US 2020/0195136 A1  Jun. 18, 2020

(30) Foreign Application Priority Data
Dec. 12, 2018  (TW) .................. 107144877

(51) Int. Cl.
*H02M 3/07*  (2006.01)
*H02M 1/00*  (2006.01)

(52) U.S. Cl.
CPC .............. *H02M 3/07* (2013.01); *H02M 1/00* (2013.01); *H02M 1/0048* (2021.05)

(58) Field of Classification Search
CPC ............. H02M 3/07; H02M 2003/071; H02M 2003/072; H02M 2003/075–078; H02M 2001/0048; H02M 2001/0051; H02M 2001/0054; H02M 1/00; H02M 2001/0003–0041
See application file for complete search history.

(56) References Cited

U.S. PATENT DOCUMENTS 8,457,578 B2 * 6/2013 Burke .................. H04B 1/28
455/205
2011/0040818 A1 * 2/2011 Fagg .................... H03H 19/004
708/313

* cited by examiner

*Primary Examiner* — Patrick C Chen
(74) *Attorney, Agent, or Firm* — Muncy, Geissler, Olds & Lowe, P.C.

(57) ABSTRACT

A switched-capacitor DC-DC power converter circuit is provided. The switched-capacitor DC-DC power converter circuit includes N input-side switched capacitor units and N output-side switched capacitor units. There is a charge recycling phase located between two adjacent conversion phases. In the 2N conversion phases, a bottom end of a capacitor of at least one of the input-side switched capacitor units and a bottom end of a capacitor of at least one of N output-side switched capacitor units is selectively electrically connected to an output terminal of the switched-capacitor DC-DC power converter circuit. In each charge recycling phase, bottom ends of two capacitors of N input-side switched capacitor units and N output-side switched capacitor units are electrically connected to each other through two of the input-side charge recycle switches and output-side charge recycle switches.

9 Claims, 8 Drawing Sheets

SWITCHED-CAPACITOR DC-DC POWER CONVERTER CIRCUIT

CROSS-REFERENCE TO RELATED APPLICATION

This application claims the benefit of Taiwan Patent Application No. 107144877, filed on Dec. 12, 2018, in the Taiwan Intellectual Property Office, the disclosure of which is incorporated herein in its entirety by reference.

BACKGROUND OF THE INVENTION

1. Field of the Invention

The present invention relates to a switched-capacitor DC-DC power converter circuit, more particularly a switched-capacitor DC-DC convertor circuit which is able to reduce switching loss.

2. Description of the Related Art

Switched-capacitor DC-DC convertor circuits have advantages of high conversion efficiency and no need to use external inductance components, so that the switched-capacitor DC-DC convertor circuits can be integrated in chips and are widely used as voltage conversion circuits in an MCUs.

The switched-capacitor DC-DC convertor circuit can comprise at least one capacitor and a plurality of switches, and during operation of the switched-capacitor DC-DC convertor circuit, the plurality of switches are frequently turned on or turned off, respectively, and the voltage across the capacitor also changes frequently. Because of the manufacturing process and the capacitor structure, parasitic capacitors are possibly formed between the above-mentioned capacitor structure and other structures in the chip, for example, between the capacitor structure and silicon substrate. As a result, when the voltage on both ends of the capacitor changes frequently, the parasitic capacitor is also frequently charged and discharged, and it causes unnecessary power loss.

SUMMARY OF THE INVENTION

In order to solve the above problem, the present invention provides a switched-capacitor DC-DC power converter circuit to reduce energy consumption of the capacitor caused by the switching process.

The present invention provides a switched-capacitor DC-DC power converter circuit, comprising: an input end; an output end; N input-side switched capacitor units, wherein each of the N input-side switched capacitor units comprises: a first switch, a second switch, a third switch, a fourth switch and a fifth switch, wherein the fourth switch is coupled to the output end; a capacitor comprising a top end selectively coupled to the input end through the first switch, and a bottom end selectively coupled to the low voltage end through the fifth switch, wherein N is a positive integer greater than one, and the top end of the capacitor is coupled to the second switch and third switch; N output-side switched capacitor units, wherein each of the N output-side switched capacitor units comprises: a sixth switch, a seventh switch, an eighth switch, a ninth switch and a tenth switch, wherein the ninth switch is coupled to the output end, and the seventh switch is coupled to the second switch, and the eighth switch is coupled to the third switch; and a capacitor comprising a top end selectively coupled to the output end through the sixth switch, and a bottom end selectively coupled to the low voltage end through the tenth switch, wherein the top end of the capacitor is coupled to the seventh switch and the eighth switch; N input-side charge recycling switches electrically connected to the bottom ends of the capacitors of the N input-side switched capacitor units, respectively; N output-side charge recycling switches electrically connected to the bottom ends of the capacitors of the N output-side switched capacitor units, respectively, wherein the N input-side charge recycling switches and the N output-side charge recycling switches are electrically connected to each other; and a switch control unit, in 2N conversion phases and 2N charge recycling phases, configured to control operational statuses of the N first switches, the N second switches, the N third switches, the N fourth switches, the N fifth switches, the N sixth switches, the N seventh switches, the N eighth switches, the N ninth switches, and the N tenth switches, so as to form an output voltage at the output end of the switched-capacitor DC-DC power converter circuit, wherein the 2N charge recycling phases are located between the adjacent conversion phases of the 2N charge recycling phases, respectively; wherein in the 2N conversion phases, the top end of the capacitor of at least one of the N input-side switched capacitor units and the top end of the capacitor of at least one of the N output-side switched capacitor units are selectively electrically connected to each other through one of the plurality of second switches and one of the plurality of seventh switches, or through one of the plurality of third switches and one of the plurality of eighth switches; wherein in the 2N conversion phases, a bottom end of the capacitor of at least one of the N input-side switched capacitor units or a bottom end of the capacitor of at least one of the N output-side switched capacitor units is selectively electrically connected to the output end through one of the plurality of fourth switches or one of the plurality of ninth switches; wherein in each of the 2N charge recycling phases, the bottom ends of two of the capacitors of the N input-side switched capacitor units and the N output-side switched capacitor units are electrically connected to each other through two of the plurality of input-side charge recycling switches and the plurality of output-side charge recycling switches.

Preferably, among the 2N conversion phases, the bottom end of the capacitor of each of the N input-side switched capacitor units is electrically connected to the output end in (N−1) conversion phases, and electrically connected to the low voltage end in other (N+1) conversion phases.

Preferably, the bottom end of the capacitor of the n-th input-side switched capacitor unit of the N input-side switched capacitor units is electrically connected to the output end in the P1-th conversion phase to Pi-th conversion phase of the 2N conversion phases, and Pi satisfies following condition: Pi=(2N−2n−i+5) mod 2N, wherein i is a positive integer greater than or equal to 1 and less than N, and n is a positive integer greater than or equal to 1 and less than or equal to N, and when Pi is equal to 0, the Pi-th conversion phase is the 2N-th conversion phase.

Preferably, among the 2N conversion phases, the bottom end of the capacitor of each of the output-side switched capacitor units is electrically connected to the output end in (N+1) conversion phases, and electrically connected to the low voltage end in other (N−1) conversion phases.

Preferably, the bottom end of the capacitor of the n-th output-side switched capacitor unit of the N output-side switched capacitor units is electrically connected to the low voltage end in the Q1-th conversion phase to the Qj-th conversion phase of the 2N conversion phases, and Qj satisfies following condition: Qj=(2n+j−1) mod 2N, wherein j is a positive integer greater than or equal to 1 and less than N, and n is a positive integer greater than or equal to 1 and less than or equal to N, and when Qj is equal to 0, the Qj-th conversion phase is the 2N-th conversion phase.

Preferably, the 2N conversion phases and the 2N charge recycling phases are interleaved with each other.

Preferably, when the bottom end of the capacitor of one of the N input-side switched capacitor units is electrically connected to the low voltage end and the output end in two adjacent conversion phases, respectively, the input-side charge recycling switch corresponding to the one of the N input-side switched capacitor units is turned on in the charge recycling phase located between the two adjacent conversion phases.

Preferably, when the bottom end of the capacitor of one of the N output-side switched capacitor units is electrically connected to the low voltage end and the output end in two adjacent conversion phases, respectively, the output-side charge recycling switch corresponding to the one of the N output-side switched capacitor units is turned on in the charge recycling phase located between the two adjacent conversion phases.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
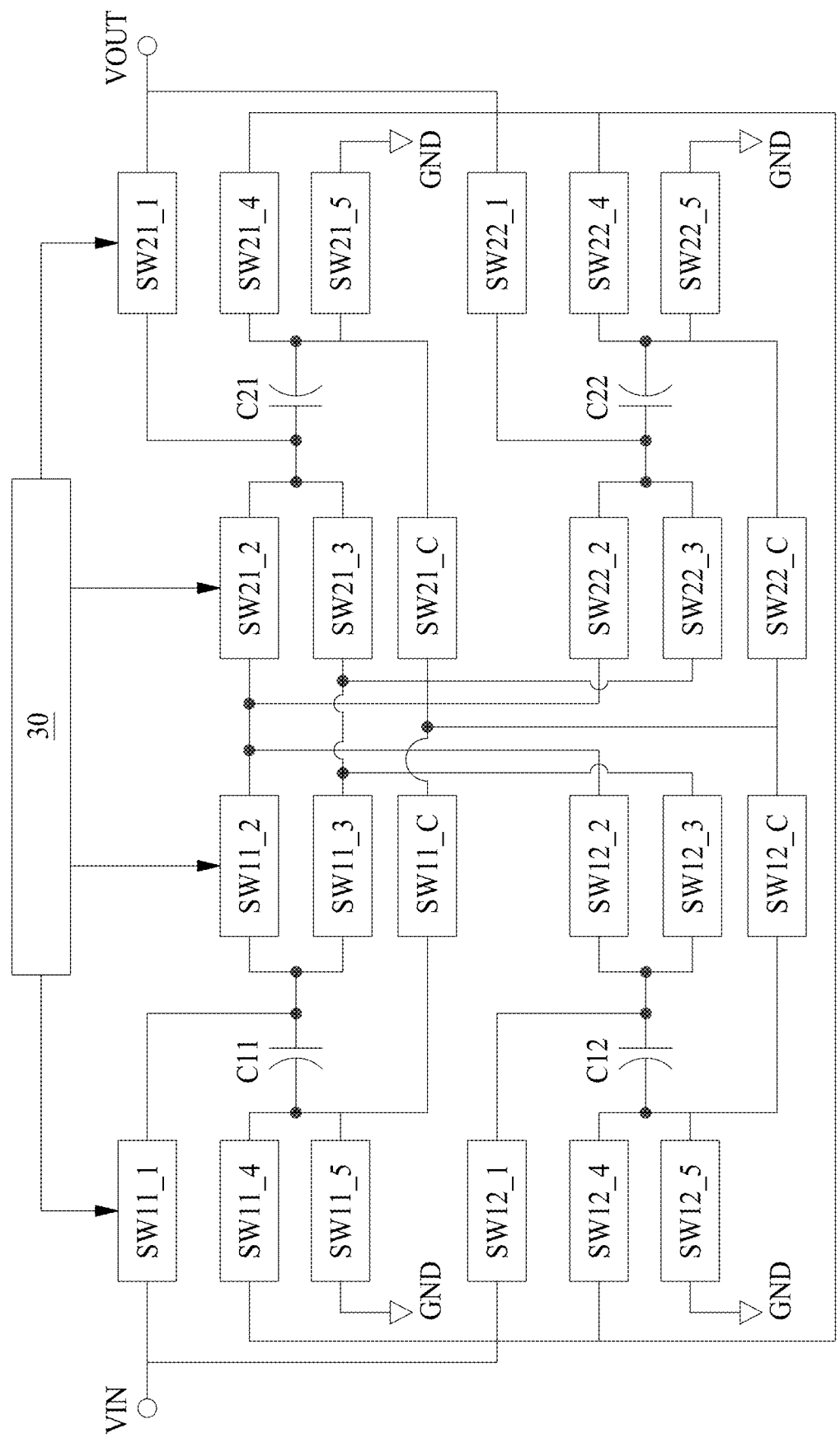
FIG. 1 is a schematic diagram showing an embodiment of a switched-capacitor DC-DC power converter circuit of the present invention.

The following embodiments of the present invention are herein described in detail with reference to the accompanying drawings. These drawings show specific examples of the embodiments of the present invention. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

The switched-capacitor DC-DC power converter circuit of the present invention comprise an input end, an output end, N input-side switched capacitor units, N output-side switched capacitor units and a switch control unit, and N is a positive integer greater than one. Each input-side switched capacitor unit or each output-side switched capacitor unit comprises a capacitor and five switches. three of the five switches are electrically connected to a top end of the capacitor, and two of the five switches are electrically connected to bottom end of the capacitor. The switch control unit controls operational statuses of the plurality of switches of the N input-side switched capacitor units and N output-side switched capacitor units in 2N conversion phases, so that form an output voltage at the output end of the switched-capacitor DC-DC power converter circuit.

Furthermore, the switched-capacitor DC-DC power converter circuit of the present invention includes a plurality of input-side charge recycling switches and a plurality of output-side charge recycling switches. The plurality of input-side charge recycling switches are electrically connected to the bottom ends of the capacitors of the N input-side switched capacitor units, respectively; the plurality of output-side charge recycling switches are electrically connected to the bottom ends of the capacitors of the N output-side switched capacitor units, respectively. The plurality of input-side charge recycling switches and the output-side charge recycling switch are electrically connected to each other.

In 2N charge recycling phases, the switch control unit controls two of the input-side charge recycling switches and the output-side charge recycling switches, to electrically connect the bottom ends of the two capacitors of the N input-side switched capacitor units and N output-side switched capacitor units.

The operation of the switched-capacitor DC-DC power converter circuit including two input-side switched capacitor units and two output-side switched capacitor units (that is, in a case of N=2) is described with reference to FIGS. 1 to 4.

Please refer to FIG. 1. In an embodiment, the switched-capacitor DC-DC power converter circuit includes the two input-side switched capacitor units and the two output-side switched capacitor units. The first input-side switched capacitor unit comprises a capacitor C11, a first switch SW11_1, a second switch SW11_2, a third switch SW11_3, a fourth switch SW11_4 and a fifth switch SW11_5. A top end of the capacitor C11 is selectively coupled to an input end VIN through the first switch SW11_1, and a bottom end of the capacitor C11 is selectively coupled to a low voltage end through the fifth switch SW11_5. In the embodiment, the low voltage end is a ground end GND.

The second input-side switched capacitor unit comprises a capacitor C12, a first switch SW12_1, a second switch SW12_2, a third switch SW12_3, a fourth switch SW12_4 and a fifth switch SW12_5. A top end of the capacitor C12 is selectively coupled to the input end VIN through the first switch SW12_1, and a bottom end of the capacitor C12 is selectively grounded through the fifth switch SW12_5.

The first output-side switched capacitor unit comprise a capacitor C21, a sixth switch SW21_1, a seventh switch SW21_2, an eighth switch SW21_3, a ninth switch SW21_4 and a tenth switch SW21_5. A top end of the capacitor C21 is selectively coupled to the output end VOUT through the sixth switch SW21_1, and the bottom end of the capacitor C21 is selectively coupled to the low voltage end through the tenth switch SW21_5. In the embodiment, the low voltage end is the ground end GND.

The second output-side switched capacitor unit comprises a capacitor C22, a sixth switch SW22_1, a seventh switch SW22_2, an eighth switch SW22_3, a ninth switch SW22_4 and a tenth switch SW22_5. A top end of the capacitor C22 is selectively coupled to the output end VOUT through the sixth switch SW22_1, and the bottom end of the capacitor C22 is selectively grounded through the tenth switch SW22_5.

The input-side charge recycling switches SW11_C and SW12_C are electrically connected to the bottom ends of the capacitors C11 and C12, respectively. The output-side charge recycling switches SW21_C and SW22_C are electrically connected to the bottom ends of the capacitors C21 and C22, respectively. The input-side charge recycling switches SW11_C and SW12_C and the output-side charge recycling switches SW21_C and SW22_C are electrically connected to each other.

The switch control unit 30 can, in four conversion phases and four charge recycling phases, turn on or off the first switches SW11_1 and SW12_1, the second switches SW11_2 and SW12_2, the third switches SW11_3 and SW12_3, the fourth switches SW11_4 and SW12_4, the fifth switches SW11_5 and SW12_5, the sixth switches SW11_1 and SW22_1, the seventh switches SW21_2 and SW22_2, the eighth switches SW21_3 and SW22_3, the ninth switches SW21_4 and SW22_4, and the tenth switch SW21_5 and SW22_5, so as to form an output voltage VOUT at the output end of the switched-capacitor DC-DC power converter circuit.

Figure 2:
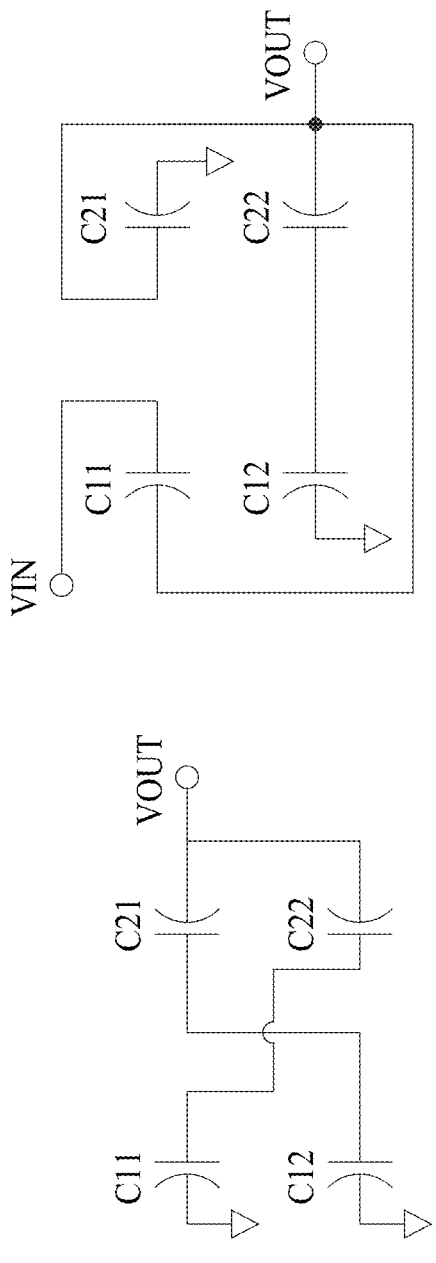
FIG. 2 is a schematic diagram of a conversion phase and a charge recycling phase of an embodiment of a switched-capacitor DC-DC power converter circuit of the present invention.
Figure 2:
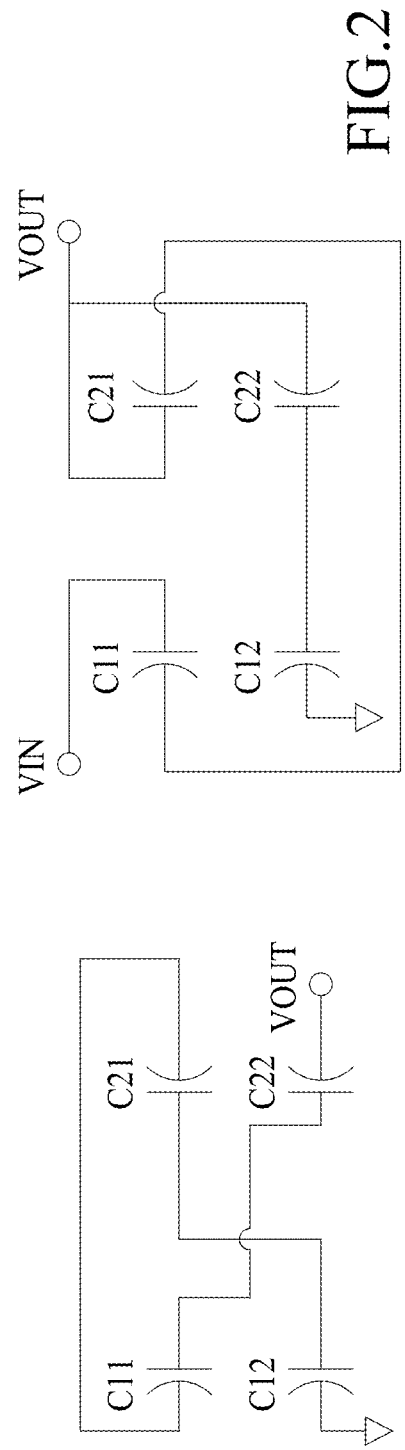
Figure 3:
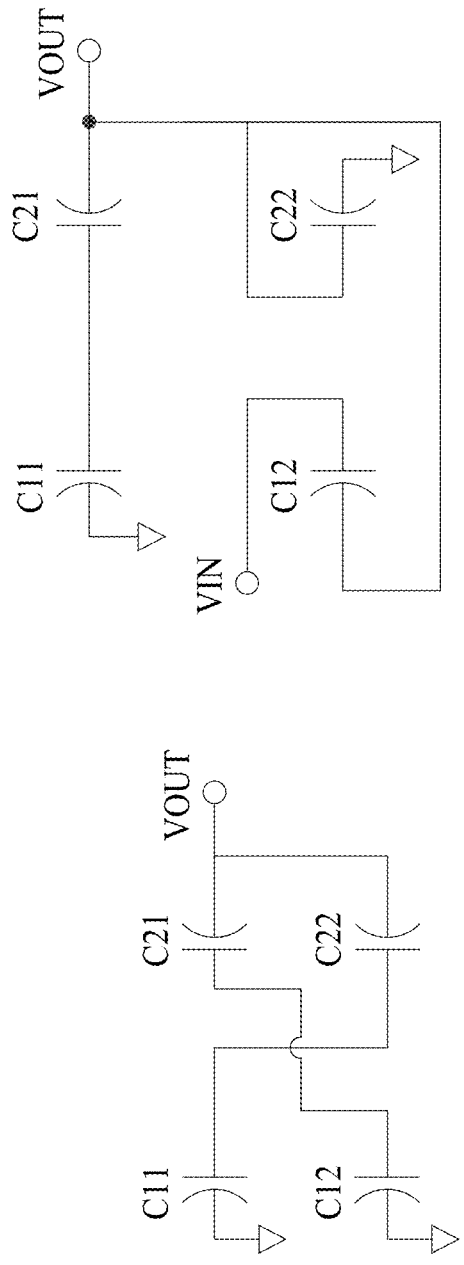
FIG. 3 is a schematic diagram of a conversion phase and a charge recycling phase of an embodiment of a switched-capacitor DC-DC power converter circuit of the present invention.
Figure 3:
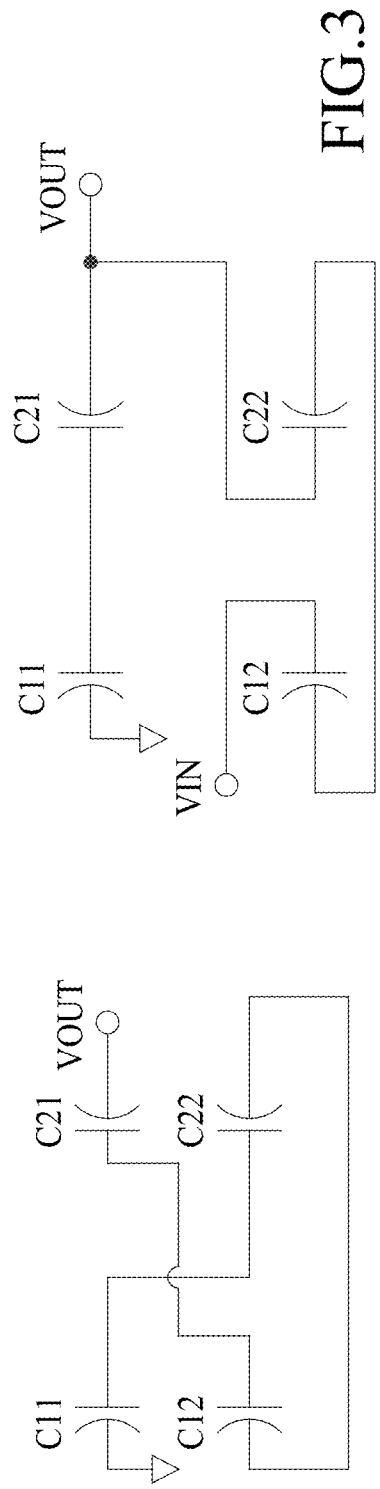

Please refer to FIG. 2 and FIG. 3, which are schematic diagrams showing conversion phases and charge recycling phases of an embodiment of a switched-capacitor DC-DC power converter circuit of the present invention. In the 2N conversion phases, a top end of the capacitor of at least one input-side switched capacitor unit is selectively electrically connected to a top end of a capacitor of at least one output-side switched capacitor unit through the second switch and the seventh switch, or through the third switch and the eighth switch.

As shown in FIGS. 2 and 3, in a case of N=2, the switched-capacitor DC-DC power converter circuit has four conversion phases. In the first conversion phase, the top ends of the capacitors C11 and C22 are electrically connected to each other, and the top ends of the capacitors C12 and C21 are electrically connected to each other; in the second conversion phases, the top ends of the capacitors C12 and C22 are electrically connected to each other; in the third conversion phase, the top ends of the capacitors C11 and C22 are electrically connected to each other, and the top ends of the capacitors C12 and C21 are electrically connected to each other; in the fourth conversion phase, the top ends of the capacitors C11 and C21 is electrically connected to each other.

In the four conversion phases, the bottom end of the capacitor of at least one input-side switched capacitor unit or a bottom end of the capacitor of at least one output-side switched capacitor unit can be selectively electrically connected to the output end through the fourth switch and the ninth switch.

As shown in FIGS. 2 and 3, in the first conversion phase, the bottom ends of the capacitors C21 and C22 are electrically connected to the output end; in the first two conversion phases, the bottom ends of the capacitors C11 and C22 are electrically connected to the output end; in the third conversion phase, the bottom ends of the capacitors C21 and C22 are electrically connected to the output end; in the fourth conversion phase, the bottom ends of the capacitors C12 and C21 are electrically connected to the output end.

The 2N charge recycling phases are located between two adjacent conversion phases of the 2N charge recycling phases, respectively. In each charge recycling phase, the bottom ends of the two capacitors of the N input-side switched capacitor units and N output-side switched capacitor units are electrically connected to each other through two of the input-side charge recycling switches and the output-side charge recycling switches.

As shown in FIGS. 2 and 3, in a case of N=2, the switched-capacitor DC-DC power converter circuit has four charge recycling phases. In the first charge recycling phase, which is located between the first conversion phase and the second conversion phase, the switch control unit 30 turns on the input-side charge recycling switch SW11_C and the output-side charge recycling switch SW21_C, to electrically connect the bottom end of the capacitor C11 to the bottom end of the capacitor C21.

Table 1 records in a case of N=2, the voltages of the bottom ends of the capacitors C11, C12, C21 and C22 of the switched-capacitor DC-DC power converter circuit in four conversion phases. As shown in Table 1, when the voltage of bottom end of the capacitor is changed during switching operation between the two adjacent conversion phases, for example, the voltage is changed from zero voltage to the output voltage, or from the output voltage to zero voltage, this voltage change causes undesired energy loss. In order to reduce this energy loss between the two adjacent conversion phases, the charge recycling phase is added and the capacitors which the voltage of the bottom end thereof are changed must be electrically connected to each other in the charge recycling phase.

TABLE ONE

| Voltage of bottom | C11 | C12 | C21 | C22 |
|---|---|---|---|---|
| First conversion phase | 0 | 0 | VOUT | VOUT |
| Second conversion phase | VOUT | 0 | 0 | VOUT |
| Third conversion phase | 0 | 0 | VOUT | VOUT |
| Fourth conversion phase | 0 | VOUT | VOUT | 0 |

As shown in Table 1, the voltage of the bottom end of the capacitor C11 is zero in the first conversion phase and is the output voltage VOUT in the second conversion phase, and the voltage of bottom end of the capacitor C21 is the output voltage VOUT in the first conversion phase and is zero in the second conversion phase; as a result, in the first charge recycling phase, which is located between the first conversion phase and the second conversion phase, the bottom end of the capacitor C11 and the bottom end of the capacitor C21 are electrically connected to each other.

According to the same principle of operation, the second charge recycling phase is located between the second conversion phase and third conversion phase, and the switch control unit 30 turns on the input-side charge recycling switch SW11_C and the output-side charge recycling switch SW21_C, so as to electrically connect the bottom end of the capacitor C11 to the bottom end of the capacitor C21. The third charge recycling phase is located between the third conversion phase and the fourth conversion phase, and the switch control unit 30 turns on the input-side charge recycling switch SW12_C and the output-side charge recycling switch SW22_C, so as to electrically connect the bottom end of the capacitor C12 to the bottom end of the capacitor C22; the fourth charge recycling phase is located between the fourth conversion phase and the first conversion phase, and the switch control unit 30 turns on the input-side charge recycling switch SW12_C and the output-side charge recycling switch SW22_C, so as to electrically connect the bottom end of the capacitor C12 to the bottom end of the capacitor C22.

Table 2 shows that in a case of N=2, the operational statuses of all switches of the first input-side switched capacitor unit in each conversion phase and each charge recycling phase. "H" indicates that the switch control signal with a high voltage level is applied to the switch, so that switch is turned on; "L" indicates that the switch control signal with a low voltage level is applied to the switch, so that switch is turned off

TABLE TWO

|  | SW11_1 | SW11_2 | SW11_3 | SW11_4 | SW11_5 | SW11_C |
|---|---|---|---|---|---|---|
| First conversion phase | L | H | L | L | H | L |
| First charge recycling phase | L | H | L | L | L | H |
| Second conversion phase | H | L | L | H | L | L |
| Second charge recycling phase | H | L | L | L | L | H |
| Third conversion phase | L | H | L | L | H | L |
| Third charge recycling phase | L | H | L | L | H | L |
| Fourth conversion phase | L | H | L | L | H | L |
| Fourth charge recycling phase | L | H | L | L | H | L |

Table 3 shows that in a case of N=2, the operational statuses of the switches of the second input-side switched capacitor unit in each conversion phase and each charge recycling phase.

TABLE THREE

|  | SW12_1 | SW12_2 | SW12_3 | SW12_4 | SW12_5 | SW12_C |
|---|---|---|---|---|---|---|
| First conversion phase | L | L | H | L | H | L |
| First charge recycling phase | L | L | H | L | H | L |
| Second conversion phase | L | H | L | L | H | L |
| Second charge recycling phase | L | H | L | L | H | L |
| Third conversion phase | L | L | H | L | H | L |
| Third charge recycling phase | L | L | H | L | L | H |
| Fourth conversion phase | H | L | L | H | L | L |
| Fourth charge recycling phase | H | L | L | L | L | H |

Table four shows that in a case of N=2, the operational statuses of the switches of the first output-side switched capacitor unit in each conversion phase and each charge recycling phase.

TABLE FOUR

|  | SW21_1 | SW21_2 | SW21_3 | SW21_4 | SW21_5 | SW21_C |
|---|---|---|---|---|---|---|
| First conversion phase | L | L | H | H | L | L |
| First charge recycling phase | L | L | H | L | L | H |
| Second conversion phase | H | L | L | L | H | L |
| Second charge recycling phase | H | L | L | L | L | H |

TABLE FOUR-continued

| | SW21_1 | SW21_2 | SW21_3 | SW21_4 | SW21_5 | SW21_C |
|---|---|---|---|---|---|---|
| Third conversion phase | L | L | H | H | L | L |
| Third charge recycling phase | L | L | H | H | L | L |
| Fourth conversion phase | L | H | L | H | L | L |
| Fourth charge recycling phase | L | H | L | H | L | L |

Table five shows that in a case of N=2, the operational statuses of the switches of the first output-side switched capacitor unit in each conversion phase and each charge recycling phase.

TABLE FIVE

| | SW22_1 | SW22_2 | SW22_3 | SW22_4 | SW22_5 | SW22_C |
|---|---|---|---|---|---|---|
| First conversion phase | L | H | L | H | L | L |
| First charge recycling phase | L | H | L | H | L | L |
| Second conversion phase | L | H | L | H | L | L |
| Second charge recycling phase | L | H | L | H | L | L |
| Third conversion phase | L | H | L | H | L | L |
| Third charge recycling phase | L | H | L | L | L | H |
| Fourth conversion phase | H | L | L | L | H | L |
| Fourth charge recycling phase | H | L | L | L | L | H |

Figure 4:
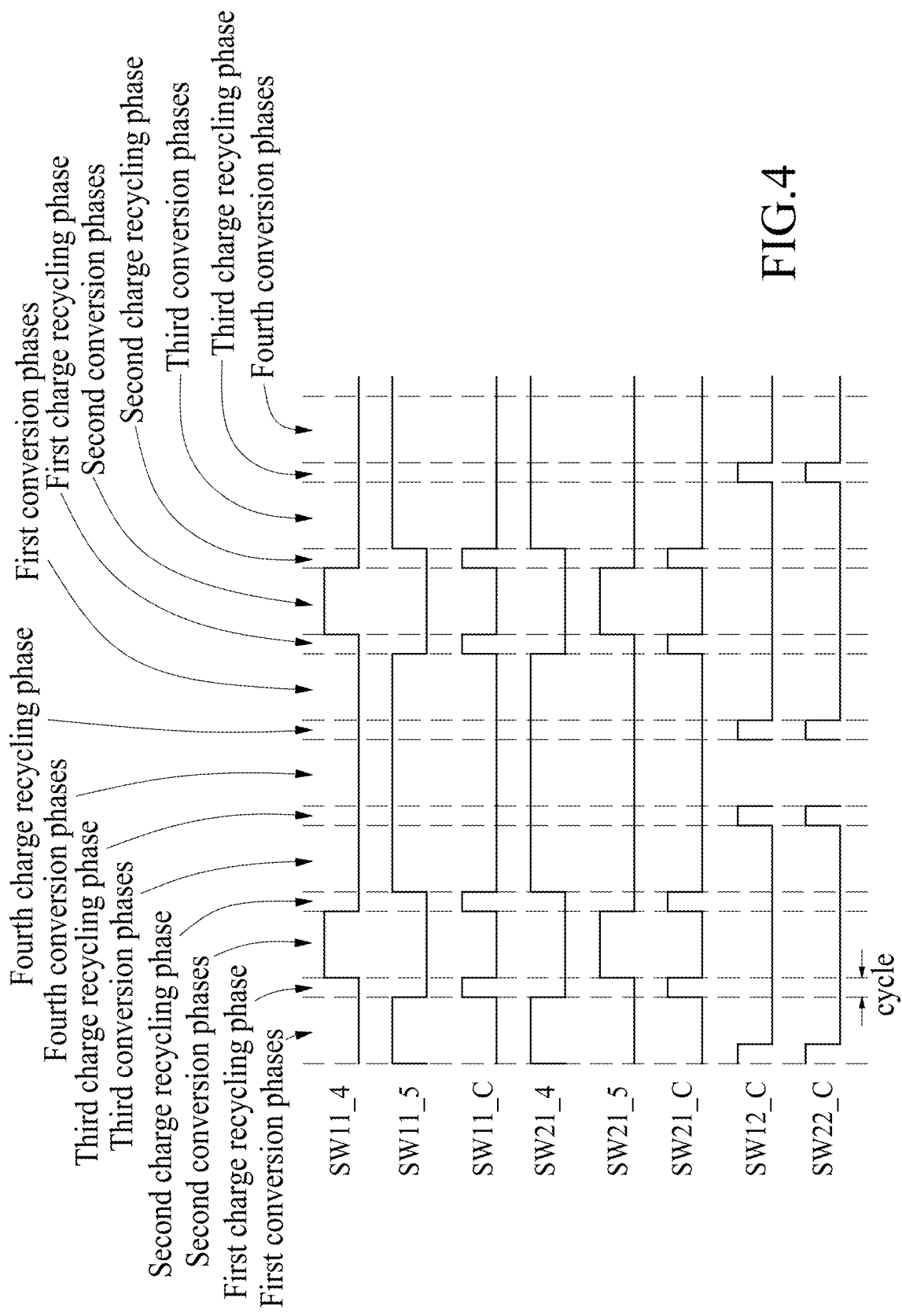
FIG. 4 is a schematic diagram of switch control signals of an embodiment of a switched-capacitor DC-DC power converter circuit of the present invention.

Please refer to FIG. 4, which is a schematic diagram of switch control signals in an embodiment of a switched-capacitor DC-DC power converter circuit of the present invention. For the sake of easy understanding, in FIG. 4, the label of switch represents the switch control signal applied to the switch; for example, as shown in FIG. 4, the switch control signal applied to the switch SW11_4 is represented by SW11_4. As shown in FIG. 4, in the first conversion phase, the switch control signal applied to switch SW11_4 is at the low voltage level (L), and the switch control signal applied to switch SW11_5 is at the high voltage level (H), and the switch control signal applied to switch SW21_4 is at the high voltage level, and the switch control signal applied to switch SW21_5 is at the low voltage level. In the second conversion phases, the switch control signal applied to switch SW11_4 is at the high voltage level, and the switch control signal applied to switch SW11_5 is at the low voltage level, and the switch control signal applied to switch SW21_4 is at the low voltage level, and the switch control signal applied to switch SW21_5 is at the high voltage level. In the first charge recycling phase between the first conversion phase and the second conversion phase, the switch control signal applied to the input-side charge recycling switch SW11_C and the output-side charge recycling switch SW21_C is at the high voltage level, so that the switch SW11_C and the switch SW21_C are turned on to electrically connect the bottom end of the capacitor C11 and the bottom end of the capacitor C21.

In an embodiment, the switch control unit 30 can delay the switch control signal, which will become the high voltage level in next conversion phase, by a preset delay time, and during the period of the preset delay time, the switch control unit 30 rises the switch control signal applied to the input-side charge recycling switch SW11_C and the output-side charge recycling switch SW21_C to the high voltage level. By the above mechanism, the switched-capacitor DC-DC power converter circuit of the present invention can increase the 2N charge recycling phases without changing the cycle of a system clock, thereby reducing the undesired energy loss.

Figure 5:
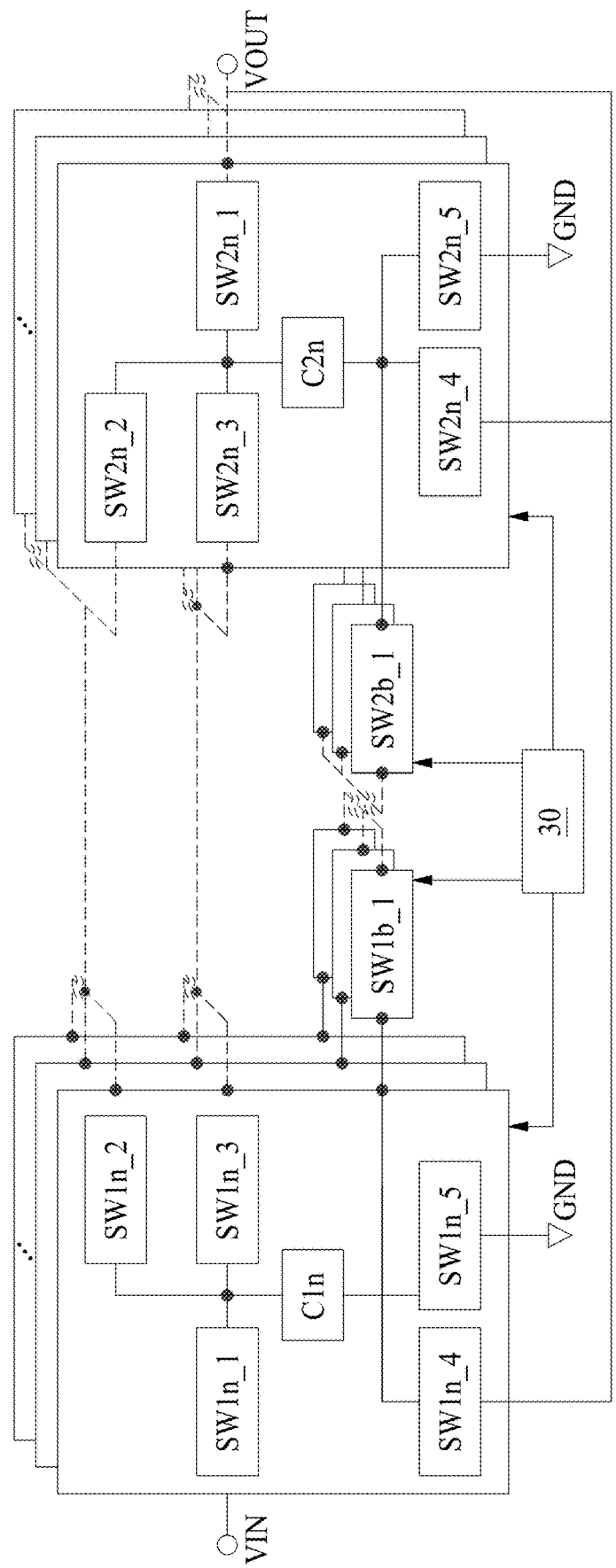
FIG. 5 is a schematic view showing another embodiment of a switched-capacitor DC-DC power converter circuit of the present invention.

Please refer to FIG. 5, which is a schematic diagram of another embodiment of a switched-capacitor DC-DC power converter circuit of the present invention. FIGS. 1 to 4 show the switched-capacitor DC-DC power converter circuit having two input-side switched capacitor units and the two output-side switched capacitor units, and the operation of the switched-capacitor DC-DC power converter circuit includes the 2N conversion phases and the 2N charge recycling phases. FIG. 5 shows a schematic diagram showing the switched-capacitor DC-DC power converter circuit having N input-side switched capacitor units and N output-side switched capacitor units. The connection between components shown in FIG. 5 is the same as that of FIG. 2, so the detailed description is not repeated.

Table 6 shows the voltages of bottom ends of the capacitors C11~C13 and C21~C23 in the first conversion phase to sixth conversion phase, in a case of N=3. The voltage of the bottom end of the capacitor can be the output voltage VOUT or zero voltage.

TABLE SIX

| Voltage of bottom end | C11 | C12 | C13 | C21 | C22 | C23 |
|---|---|---|---|---|---|---|
| First conversion phase | VOUT | 0 | 0 | VOUT | VOUT | 0 |
| Second conversion phase | VOUT | 0 | 0 | 0 | VOUT | VOUT |
| Third conversion phase | 0 | 0 | VOUT | 0 | VOUT | VOUT |
| Fourth conversion phase | 0 | 0 | VOUT | VOUT | 0 | VOUT |
| Fifth conversion phase | 0 | VOUT | 0 | VOUT | 0 | VOUT |
| Sixth conversion phase | 0 | VOUT | 0 | VOUT | VOUT | 0 |

Table 7 shows the voltages of bottom ends of the capacitors C11~C14 and C21~C24 in the first conversion phase to the eighth conversion phase, in a case of N=4. The voltage of the bottom end of the capacitor can be output voltage VOUT or zero voltage.

TABLE SEVEN

| Voltage of bottom end | C11 | C12 | C13 | C14 | C21 | C22 | C23 | C24 |
|---|---|---|---|---|---|---|---|---|
| First conversion phase | VOUT | 0 | 0 | 0 | VOUT | VOUT | VOUT | 0 |
| Second conversion phase | VOUT | 0 | 0 | VOUT | 0 | VOUT | VOUT | 0 |
| Third conversion phase | 0 | 0 | 0 | VOUT | 0 | VOUT | VOUT | VOUT |
| Fourth conversion phase | 0 | 0 | VOUT | VOUT | 0 | 0 | VOUT | VOUT |
| Fifth conversion phase | 0 | 0 | VOUT | 0 | VOUT | 0 | VOUT | VOUT |
| Sixth conversion phase | 0 | VOUT | VOUT | 0 | VOUT | 0 | 0 | VOUT |
| Seventh conversion phase | 0 | VOUT | 0 | 0 | VOUT | VOUT | 0 | VOUT |
| Eighth conversion phase | VOUT | VOUT | 0 | 0 | VOUT | VOUT | 0 | 0 |

Table 8 shows the voltages of bottom ends of the capacitors C11~C15 and C21~C25 in the first conversion phase to the tenth conversion phase in a case of N=5. The voltage of the bottom end of the capacitor can be the output voltage VOUT or zero voltage.

TABLE EIGHT

| Voltage of bottom end | C11 | C12 | C13 | C14 | C15 | C21 | C22 | C23 | C24 | C25 |
|---|---|---|---|---|---|---|---|---|---|---|
| First conversion phase | VOUT | 0 | 0 | 0 | VOUT | VOUT | VOUT | VOUT | 0 | 0 |
| Second conversion phase | VOUT | 0 | 0 | 0 | VOUT | 0 | VOUT | VOUT | VOUT | 0 |
| Third conversion phase | 0 | 0 | 0 | VOUT | VOUT | 0 | VOUT | VOUT | VOUT | 0 |
| Fourth conversion phase | 0 | 0 | 0 | VOUT | VOUT | 0 | 0 | VOUT | VOUT | VOUT |
| Fifth conversion phase | 0 | 0 | VOUT | VOUT | 0 | 0 | 0 | VOUT | VOUT | VOUT |
| Sixth conversion phase | 0 | 0 | VOUT | VOUT | 0 | VOUT | 0 | 0 | VOUT | VOUT |
| Seventh conversion phase | 0 | VOUT | VOUT | 0 | 0 | VOUT | 0 | 0 | VOUT | VOUT |
| Eighth conversion phase | 0 | VOUT | VOUT | 0 | 0 | VOUT | VOUT | 0 | 0 | VOUT |
| Ninth conversion phase | VOUT | VOUT | 0 | 0 | 0 | VOUT | VOUT | 0 | 0 | VOUT |
| Tenth conversion phase | VOUT | VOUT | 0 | 0 | 0 | VOUT | VOUT | VOUT | 0 | 0 |

As shown in Tables 1, 6 to 8, among the 2N conversion phases, the bottom end of the capacitor of each of the N output-side switched capacitor units is electrically connected to the output end in (N−1) conversion phases, for example, the voltage of the bottom end can be VOUT; the bottom end of the capacitor of each of the N output-side switched capacitor units is electrically connected to the low voltage end in other (N+1) conversion phases, for example, the voltage of bottom end can be zero voltage; the bottom end of capacitor of each of the N output-side switched capacitor units is electrically connected to the output end in the (N+1) conversion phases, and is electrically connected to the low voltage end in other (N−1) conversion phases, for example, the voltage of bottom end can be zero voltage.

The bottom end of the capacitor of the n-th input-side switched capacitor unit of the N input-side switched capacitor units is electrically connected to the output end, in the P1-th conversion phase to Pi-th conversion phase of the 2N conversion phases, wherein Pi satisfies the equation (1):

$$Pi=(2N-2n-i+5) \bmod 2N \qquad \text{equation (1)}$$

wherein i is a positive integer greater than or equal to 1 and less than N, and n is a positive integer greater than or equal to 1 and less than or equal to N, mod is a modulo calculation or a modulo operation, and when Pi is equal to 0, the Pi-th conversion phase is the 2N-th conversion phases.

The bottom end of the capacitor of the n-th output-side switched capacitor unit of the N output-side switched capacitor units is electrically connected to the low voltage end in the Q1-th conversion phase to the Qj-th conversion phase of the 2N conversion phases, wherein Qj satisfies equation (2):

$$Qj=(2n+j-1) \bmod 2N \qquad \text{equation (2)}$$

wherein j is a positive integer greater than or equal to 1 and less than N, and n is a positive integer greater than or equal to 1 and less than or equal to N, When Qj is equal to 0, the Qj-th conversion phase is the 2N-th conversion phases.

For example, when N is equal to 3, i is in a range of 1 to 2, and it indicates the bottom end of the capacitor of the input-side switched capacitor unit is electrically connected to the output end in two conversion phases. The bottom end of the capacitor C11 of the first input-side switched capacitor unit (that is, n=1) is electrically connected to the output end in the P1-th conversion phase to the P2-th conversion phase, wherein the value of P1 and P2 can be calculated as follows:

$$P1=(2*3-2*1-1+5) \bmod 6=2$$

$$P2=(2*3-2*1-2+5) \bmod 6=1$$

The bottom end of the capacitor C11 is electrically connected to the output end in the first conversion phase and the second conversion phase. Similarly, according to the equation (1), it can determine that the bottom end of the capacitor C12 of the second input-side switched capacitor unit (that is, n=2) is electrical connected to the output end in the sixth conversion phase and the fifth conversion phase; the bottom end of the capacitor C13 of the third input-side switched capacitor unit (that is, n=3) is electrically connected to the output end in the third conversion phases and the four conversion phases, as shown in Table six.

When N is equal to 3, j can be in a range of 1 to 2, it indicates that the bottom end of the capacitor of the output-side switched capacitor unit is electrically connected to the output end in two conversion phases. In the embodiment, the low voltage end is the ground. The bottom end of the capacitor C21 of the first output-side switched capacitor unit (that is, n=1) is grounded in the first Q1 to Q2 conversion phase, wherein the value of Q1 and Q2 can be calculated as follows:

$$Q1=(2*1+1-1) \bmod 6=2$$

$$Q2=(2*1+2-1) \bmod 6=3$$

The bottom end of the capacitor C21 is grounded in the second conversion phase and the third conversion phase. Similarly, according to the equation (2), it can calculate that the bottom end of the capacitor C22 of the second output-side switched capacitor unit (that is, n=2) is grounded, in the fourth conversion phase and the fifth conversion phase; the bottom end of the capacitor C23 of the third output-side switched capacitor unit (that is, n=3) is grounded in the sixth conversion phase and the first conversion phase, as shown in Table six.

When bottom ends of the capacitors of the input-side switched capacitor unit or the output-side switched capacitor unit are electrically connected to the low voltage end and the output end in the two adjacent two conversion phases, respectively, the corresponding output-side charge recycling switch is turned on in the charge recycling phase located between two adjacent two conversion phases. As shown in the table six, the bottom end of the capacitor C11 is electrically connected to the output end and is grounded in the second conversion phase and the third conversion phase, respectively, so that the switch SW11_C is turned on in the second charge recycling phase; at the same time, the bottom end of the capacitor C13 is grounded and electrically connected to the output end in the second conversion phase and the third conversion phase, respectively, and the switch SW13_C is also turned on in the second charge recycling phase. Therefore, in the second charge recycling phase, the bottom ends of the capacitors C11 and C13 are electrically connected to each other.

Similarly, the bottom end of the capacitor C11 is grounded and electrically connected to the output end in the sixth conversion phase and the first conversion phase, respectively, so that the switch SW11_C is turned on at the sixth charge recycling phase; at the same time, the bottom end of the capacitor C12 is electrically connected to the output end and grounded in the sixth conversion phase and the first conversion phase, respectively, so that the switch SW12_C is also turned on in the sixth charge recycling phase. Therefore, in the sixth charge recycling phase, the bottom ends of the capacitors C11 and C12 are electrically connected to each other.

Figure 6:
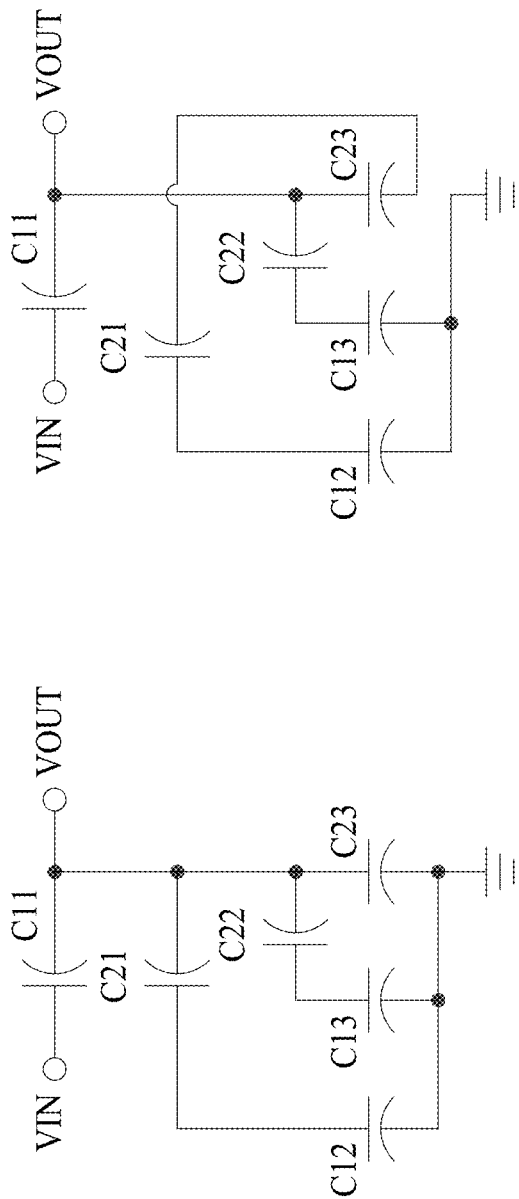
FIG. 6 is a schematic diagram of a conversion phase and a charge recycling phase of another embodiment of a switched-capacitor DC-DC power converter circuit of the present invention.
Figure 6:
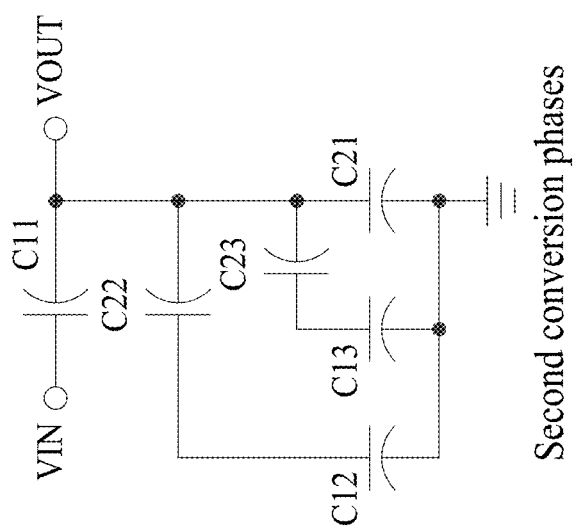
Figure 7:
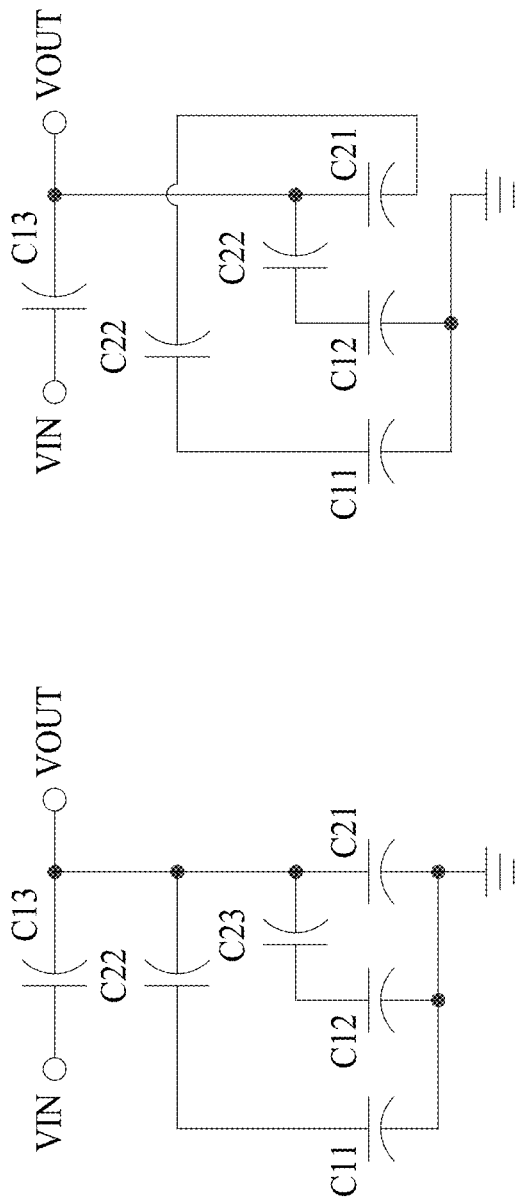
FIG. 7 is a schematic diagram of a conversion phase and a charge recycling phase of another embodiment of a switched-capacitor DC-DC power converter circuit of the present invention.
Figure 7:
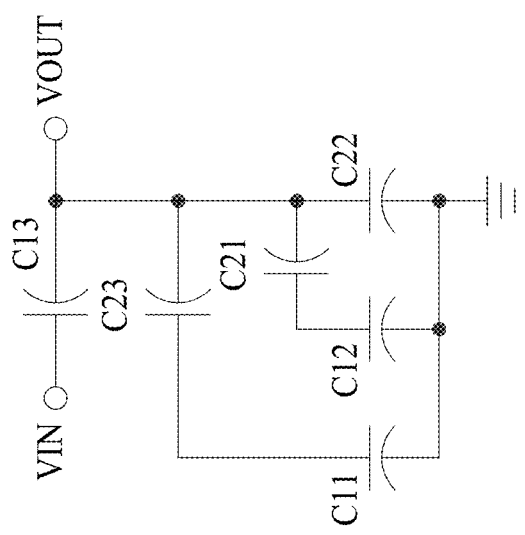
Figure 8:
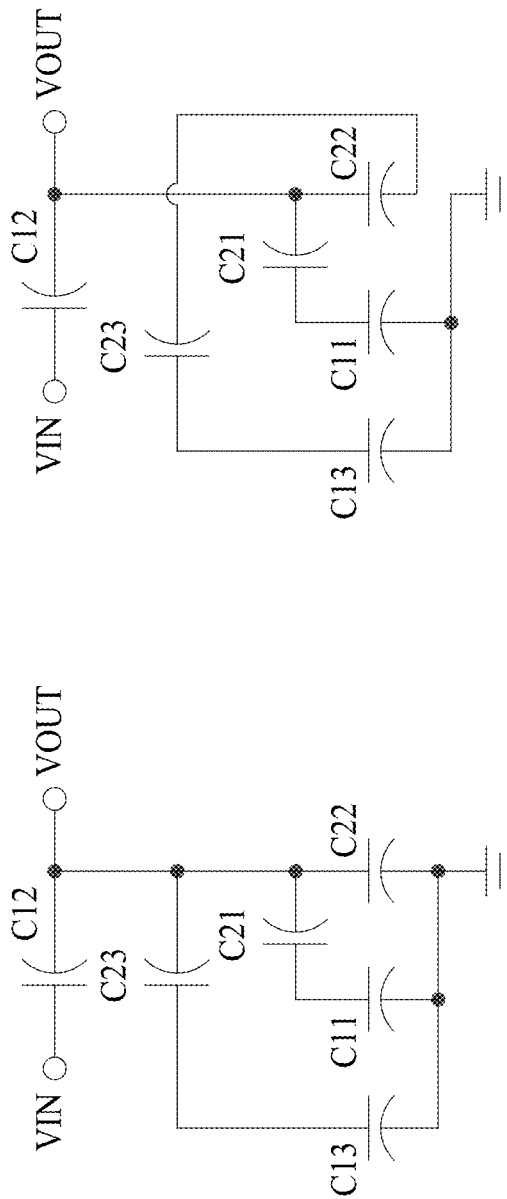
FIG. 8 is a schematic diagram of a conversion phase and a charge recycling phase of another embodiment of a switched-capacitor DC-DC power converter circuit of the present invention.
Figure 8:
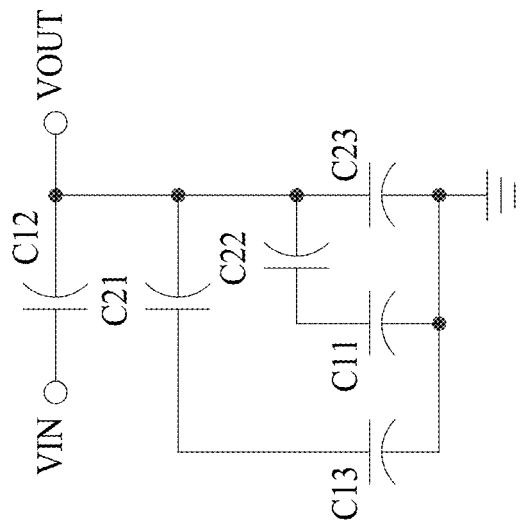

According to the above calculation principle, it can determine the connection relationship between the bottom ends of the capacitors C11 to C13 and the capacitors C21 to C23 in the first charge recycling phase to the sixth charge recycling phase, as shown in FIGS. 6 to 8.

According to the above equations (1) and (2), it possible determines the connection relationship between bottom ends of all capacitors and the output end and the low voltage end in a case where N is equal to 4, and in a case where N is equal to 5, and the connection relationship of bottom ends of the capacitors in all charge recycling phases can also be determined.

For example, in a case of N=4, i can be in a range from 1 to 3, and it indicates the bottom end of the capacitor of each input-side switched capacitor unit is electrically connected to the output end in three conversion phases. The bottom end of the capacitor C11 of the first input-side switched capacitor unit (that is, n=1) is electrically connected to the output end in the P1-th conversion phase to the P3-th conversion phase, wherein the value of P1, P2 and P3 can be calculated as follows:

$$P1=(2*4-2*1-1+5) \bmod 8=2$$

$$P2=(2*4-2*1-2+5) \bmod 8=1$$

$$P3=(2*4-2*1-3+5) \bmod 8=0$$

Therefore, the bottom end of the capacitor C11 is electrically connected to the output end in the second conversion phase, the first conversion phase and the eighth conversion phase. Similarly, according to the equation (1), it can be calculated that the bottom end of the capacitor C22 of the second input-side switched capacitor unit (that is, n=2) is electrically connected to the output end in the eighth conversion phase, the seventh conversion phase and the sixth conversion phase; the bottom end of the capacitor C13 of the third input-side switched capacitor unit (that is, n=3) is electrically connected to the output end in the sixth conversion phase, the fifth conversion phase and the four conversion phases; the bottom end of the capacitor C14 of the fourth input-side switched capacitor unit (that is, n=4) is electrically connected to output end in the fourth conversion phases, the third conversion phase and the second conversion phase, are shown in Table seven.

In a case of N=4, j can be in a range of 1 to 3, and it indicates the bottom end of the capacitor of the output-side switched capacitor unit can be electrically connected to the output end in three conversion phases. In the embodiment, the low voltage end is the ground end. The bottom end of the capacitor C21 of the first output-side switched capacitor unit (that is, n=1) is grounded in the Q1-th to Q3-th conversion phase, wherein the value of Q1, Q2 and Q3 can be calculated as follows:

$$Q1=(2*1+1-1)\mod 8=2$$

$$Q2=(2*1+2-1)\mod 8=3$$

$$Q3=(2*1+3-1)\mod 8=4$$

The bottom end of the capacitor C21 is grounded in the second conversion phase, the third conversion phase and the four conversion phases. Similarly, according to the equation (2), it can calculate that the bottom end of the capacitor C22 of the second output-side switched capacitor unit (that is, n=2) is grounded in the fourth conversion phases, the fifth conversion phase and the sixth conversion phase; the bottom end of the capacitor C23 of the third output-side switched capacitor unit (that is, n=3) is grounded in the sixth conversion phase, the seventh conversion phase, and the eighth conversion phase; the bottom end of the capacitor C24 of the fourth output-side switched capacitor unit (that is, n=4) is grounded in the eighth conversion phase, the first conversion phase, and the second conversion phase, as shown in Table seven.

As shown in the table seven, the bottom end of the capacitor C11 is electrically connect the output end and grounded in the second conversion phase and the third conversion phase, respectively, so that the switch SW11_C is turned on in the second charge recycling phase; at the same time, the bottom end of the capacitor C24 is grounded and electrically connected to the output end in the second conversion phase and the third conversion phase, respectively, so that the switch SW24_C is turned on in the second charge recycling phase. As a result, in the second charge recycling phase, the bottom ends of the capacitors C11 and C24 are electrically connected to each other.

Similarly, the bottom end of the capacitor C11 is grounded and electrically connected to the output end in the seventh conversion phase and the eighth conversion phase, respectively, so that the switch SW11_C is turned on in the seventh charge recycling phase; at the same time, the bottom end of the capacitor C24 is electrically connected output end and grounded in the seventh conversion phase and the eighth conversion phase, respectively, so that the switch SW24_C is turned on in the seventh charge recycling phase. As a result, in the seventh charge recycling phase, the bottom ends of the capacitors C11 and C24 are electrically connected to each other.

According to the table seven and the above determination principle, in a case of N=4, in the first charge recycling phase, the bottom ends of the capacitors C14 and C21 are electrically connected to each other; in the second charge recycling phase, the bottom ends of capacitors C11 and C24 are electrically connected to each other; in the third charge recycling phase, the bottom ends of the capacitors C13 and C22 are electrically connected to each other; in the fourth charge recycling phase, the bottom ends of the capacitors C14 and C21 are electrically connected to each other; in the fifth charge recycling phase, the bottom ends of the capacitors C12 and C23 are electrically connected to each other; in the sixth charge recycling phase, the bottom ends of the capacitors C13 and C22 are electrically connected to each other; in the seventh charge recycling phase, the bottom ends of capacitors C11 and C24 are electrically connected to each other; in the eighth charge recycling phase, the bottom ends of the capacitors C12 and C23 are electrically connected to each other.

Furthermore, according to the table eight and the above determination principle, when N is equal to 5, in the first charge recycling phase, the bottom ends of capacitors C21 and C24 are electrically connected to each other; in the second charge recycling phase, the bottom ends of the capacitors C11 and C14 are electrically connected to each other; in the third charge recycling phase, the bottom ends of the capacitors C22 and C25 are electrically connected to each other; in the fourth charge recycling phase, the bottom ends of the capacitors C13 and C15 are electrically connected to each other; in the fifth charge recycling phase, the bottom ends of the capacitors C21 and C23 are electrically connected to each other; in the sixth charge recycling phase, the bottom ends of the capacitors C12 and C14 are electrically connected to each other; in the seventh charge recycling phase, the bottom ends of capacitors C22 and C24 are electrically connected to each other; in the eighth charge recycling phase, the bottom ends of the capacitors C11 and C13 are electrically connected to each other; in the ninth charge recycling phase, the bottom ends of the capacitors C23 and C25 are electrically connected to each other; in the tenth charge recycling phase, the bottom ends of the capacitors C12 and C15 are electrically connected to each other.

It should be noted that the order of the operational status of the switches in the above multiple conversion phase is merely for exemplary illustration, and the present invention is not limited thereto. Any embodiment using the correspondence relationships, between the operational statuses of the switches of the input side and the operational statuses of the switches of the output side, equivalent to the data shown in the above tables is within the scope of the patent application of the present invention. For example, in the table eight, if the first conversion phase is changed to the second conversion phase, the second conversion phase is changed to the third conversion phase, and so on, and the tenth conversion phase is changed to the first conversion phase, as shown in a table nine, the same effects as the present invention are achieved.

| Voltage of bottom end | C11 | C12 | C13 | C14 | C15 | C21 | C22 | C23 | C24 | C25 |
|---|---|---|---|---|---|---|---|---|---|---|
| First conversion phase | VOUT | VOUT | 0 | 0 | 0 | VOUT | VOUT | VOUT | 0 | 0 |
| Second conversion phase | VOUT | 0 | 0 | 0 | VOUT | VOUT | VOUT | VOUT | 0 | 0 |
| Third conversion phase | VOUT | 0 | 0 | 0 | VOUT | 0 | VOUT | VOUT | VOUT | 0 |
| Fourth conversion phase | 0 | 0 | 0 | VOUT | VOUT | 0 | VOUT | VOUT | VOUT | 0 |
| Fifth conversion phase | 0 | 0 | 0 | VOUT | VOUT | 0 | 0 | VOUT | VOUT | VOUT |
| Sixth conversion phase | 0 | 0 | VOUT | VOUT | 0 | 0 | 0 | VOUT | VOUT | VOUT |
| Seventh conversion phase | 0 | 0 | VOUT | VOUT | 0 | VOUT | 0 | 0 | VOUT | VOUT |
| Eighth conversion phase | 0 | VOUT | VOUT | 0 | 0 | VOUT | 0 | 0 | VOUT | VOUT |
| Ninth conversion phase | 0 | VOUT | VOUT | 0 | 0 | VOUT | VOUT | 0 | 0 | VOUT |
| Tenth conversion phase | VOUT | VOUT | 0 | 0 | 0 | VOUT | VOUT | 0 | 0 | VOUT |

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A switched-capacitor DC-DC power converter circuit, comprising:

an input end;

an output end;

N input-side switched capacitor units, wherein each of the N input-side switched capacitor units comprises:

a first switch, a second switch, a third switch, a fourth switch and a fifth switch, wherein the fourth switch is coupled to the output end;

a capacitor comprising a top end selectively coupled to the input end through the first switch, and a bottom end selectively coupled to a low voltage end through the fifth switch, wherein N is a positive integer greater than one, and the top end of the capacitor is coupled to the second switch and third switch;

N output-side switched capacitor units, wherein each of the N output-side switched capacitor units comprises:

a sixth switch, a seventh switch, an eighth switch, a ninth switch and a tenth switch, wherein the ninth switch is coupled to the output end, and the seventh switch is coupled to the second switch, and the eighth switch is coupled to the third switch; and a capacitor comprising a top end selectively coupled to the output end through the sixth switch, and a bottom end selectively coupled to the low voltage end through the tenth switch, wherein the top end of the capacitor is coupled to the seventh switch and the eighth switch;

N input-side charge recycling switches electrically connected to the bottom ends of the capacitors of the N input-side switched capacitor units, respectively;

N output-side charge recycling switches electrically connected to the bottom ends of the capacitors of the N output-side switched capacitor units, respectively, wherein the N input-side charge recycling switches and the N output-side charge recycling switches are electrically connected to each other; and a switch control unit, in 2N conversion phases and 2N charge recycling phases of each operational cycle, configured to control operational statuses of the N first switches, the N second switches, the N third switches, the N fourth switches, the N fifth switches, the N sixth switches, the N seventh switches, the N eighth switches, the N ninth switches, and the N tenth switches, so as to form an output voltage at the output end of the switched-capacitor DC-DC power converter circuit, wherein the 2N charge recycling phases are located between the adjacent conversion phases of the 2N charge recycling phases, respectively;

wherein in the 2N conversion phases, the top end of the capacitor of at least one of the N input-side switched capacitor units and the top end of the capacitor of at least one of the N output-side switched capacitor units are selectively electrically connected to each other through one of the plurality of second switches and one of the plurality of seventh switches, or through one of the plurality of third switches and one of the plurality of eighth switches;

wherein in the 2N conversion phases, the bottom end of the capacitor of at least one of the N input-side switched capacitor units or the bottom end of the capacitor of at least one of the N output-side switched capacitor units is selectively electrically connected to the output end through one of the plurality of fourth switches or one of the plurality of ninth switches;

wherein in each of the 2N charge recycling phases, the bottom ends of two of the capacitors of the N input-side switched capacitor units and the N output-side switched capacitor units are electrically connected to each other through two of the plurality of input-side charge recycling switches and the plurality of output-side charge recycling switches, so as to recycle charges.

2. The switched-capacitor DC-DC power converter circuit according to claim 1, wherein among the 2N conversion phases, the bottom end of the capacitor of each of the N input-side switched capacitor units is electrically connected to the output end in (N-1) conversion phases, and electrically connected to the low voltage end in other (N+1) conversion phases.

3. The switched-capacitor DC-DC power converter circuit according to claim 2, wherein the bottom end of the capacitor of the n-th input-side switched capacitor unit of the N input-side switched capacitor units is electrically connected to the output end in the P1-th conversion phase to Pi-th conversion phase of the 2N conversion phases, and Pi satisfies following condition:

$$Pi=(2N-2n-i+5) \bmod 2N,$$

wherein i is a positive integer greater than or equal to 1 and less than N, and n is a positive integer greater than or equal to 1 and less than or equal to N, and when Pi is equal to 0, the Pi-th conversion phase is the 2N-th conversion phase.

4. The switched-capacitor DC-DC power converter circuit according to claim 1, wherein among the 2N conversion phases, the bottom end of the capacitor of each of the output-side switched capacitor units is electrically connected to the output end in (N+1) conversion phases, and electrically connected to the low voltage end in other (N-1) conversion phases.

5. The switched-capacitor DC-DC power converter circuit according to claim 4, wherein the bottom end of the capacitor of the n-th output-side switched capacitor unit of the N output-side switched capacitor units is electrically connected to the low voltage end in the Q1-th conversion phase to the Qj-th conversion phase of the 2N conversion phases, and Qj satisfies following condition:

$$Qj=(2n+j-1) \bmod 2N,$$

wherein j is a positive integer greater than or equal to 1 and less than N, and n is a positive integer greater than or equal to 1 and less than or equal to N, and when Qj is equal to 0, the Qj-th conversion phase is the 2N-th conversion phase.

6. The switched-capacitor DC-DC power converter circuit according to claim 1, wherein the 2N conversion phases and the 2N charge recycling phases are interleaved with each other.

7. The switched-capacitor DC-DC power converter circuit according to claim 1, wherein when the bottom end of the capacitor of one of the N input-side switched capacitor units is electrically connected to the low voltage end and the output end in two adjacent conversion phases, respectively, the input-side charge recycling switch corresponding to the one of the N input-side switched capacitor units is turned on in the charge recycling phase located between the two adjacent conversion phases.

8. The switched-capacitor DC-DC power converter circuit according to claim 1, wherein when the bottom end of the capacitor of one of the N output-side switched capacitor units is electrically connected to the low voltage end and the output end in two adjacent conversion phases, respectively, the output-side charge recycling switch corresponding to the one of the N output-side switched capacitor units is turned on in the charge recycling phase located between the two adjacent conversion phases.

9. A switched-capacitor DC-DC power converter circuit comprise
an input end;
an output end;
N input-side switched capacitor units, wherein each of the N input-side switched capacitor units comprises a capacitor and a plurality of switches, and top ends of the capacitors are selectively electrically connected to the input end through the plurality of switches, wherein N is a positive integer greater than one;
N output-side switched capacitor units, wherein each of the N output-side switched capacitor units comprises a capacitor and a plurality of switches, and top ends of the capacitors are selectively electrically connected to the output end through the plurality of switches;
a plurality of input-side charge recycling switches electrically connected to the bottom ends of the capacitors of the N input-side switched capacitor units, respectively;
a plurality of output-side charge recycling switches electrically connected to the bottom ends of the capacitors of the N output-side switched capacitor units, respectively, wherein the plurality of input-side charge recycling switches and the plurality of output-side charge recycling switches are electrically connected to each other;
a switch control unit, in 2N conversion phases and 2N charge recycling phases of each operational cycle, configured to control the operational statuses of the plurality of switches of the N input-side switched capacitor units, the plurality of switches of the N output-side switched capacitor units, the plurality of input-side charge recycling switches and the plurality of output-side charge recycling switches, so that form an output voltage at the output end of the switched-capacitor DC-DC power converter circuit, wherein the 2N conversion phases and the 2N charge recycling phases are interleaved with each other;
wherein, in each of the 2N conversion phases, the switch control unit controls the plurality of switches of each of the N input-side switched capacitor units to make a bottom end of the capacitor of each of the N input-side switched capacitor units connect to one of the low voltage end and the output end, and the switch control unit controls the plurality of switches of each of the N output-side switched capacitor units to make a bottom end of the capacitor of each of the N output-side switched capacitor units electrically connect to one of the low voltage end one the output end;
wherein in each of the 2N charge recycling phases, the switch control unit controls the plurality of input-side charge recycling switches and the plurality of output-side charge recycling switches make the bottom ends of the capacitors of two of the N input-side switched capacitor units and the N output-side switched capacitor units electrically connect to each other and not electrically connect to each other, so as to recycle charges.

* * * * *